United States Patent [19]

Iida

[11] Patent Number: 4,711,654
[45] Date of Patent: Dec. 8, 1987

[54] APPARATUS FOR SHAPING GLASS SHEET

[75] Inventor: Naohiro Iida, Osaka, Japan

[73] Assignee: Nippon Sheet Glass Co., Ltd., Osaka, Japan

[21] Appl. No.: 9,271

[22] Filed: Jan. 30, 1987

[30] Foreign Application Priority Data

Feb. 3, 1986 [JP] Japan .................................. 61-21627

[51] Int. Cl.$^4$ .......................................... C03B 23/023
[52] U.S. Cl. ........................................ 65/172; 65/106; 65/273; 65/173
[58] Field of Search ................. 65/104, 106, 107, 114, 65/290, 291, 273, 171, 172, 173

[56] References Cited

U.S. PATENT DOCUMENTS

| 4,092,141 | 5/1978 | Frank et al. | 65/114 |
| 4,108,624 | 8/1978 | Claassen | 65/106 X |
| 4,470,835 | 9/1984 | Fecik et al. | 65/273 X |
| 4,501,603 | 2/1985 | Frank et al. | 65/273 X |
| 4,662,925 | 5/1987 | Thimons et al. | 65/104 |

FOREIGN PATENT DOCUMENTS 53-12931   5/1978   Japan .

Primary Examiner—Arthur Kellogg
Attorney, Agent, or Firm—Bogucki, Scherlacher, Mok & Roth

[57] ABSTRACT

A glass sheet shaping apparatus shapes a curved reinforced glass sheet by bending a glass sheet which has been heated by a heating furnace up to a softening point and thereafter cooling the bent glass sheet with a cooling medium and imparting a prescribed stress to the glass sheet. The glass sheet is bent by upper and lower mold members fixed to respective common plates which are interconnected by positioning rods. The unit assembly comprising these upper and lower mold members and common plates is carried on a carrier and moved by a suitable displacing device onto a lower surface plate located in a frame assembly for replacing the existing unit assembly.

6 Claims, 16 Drawing Figures

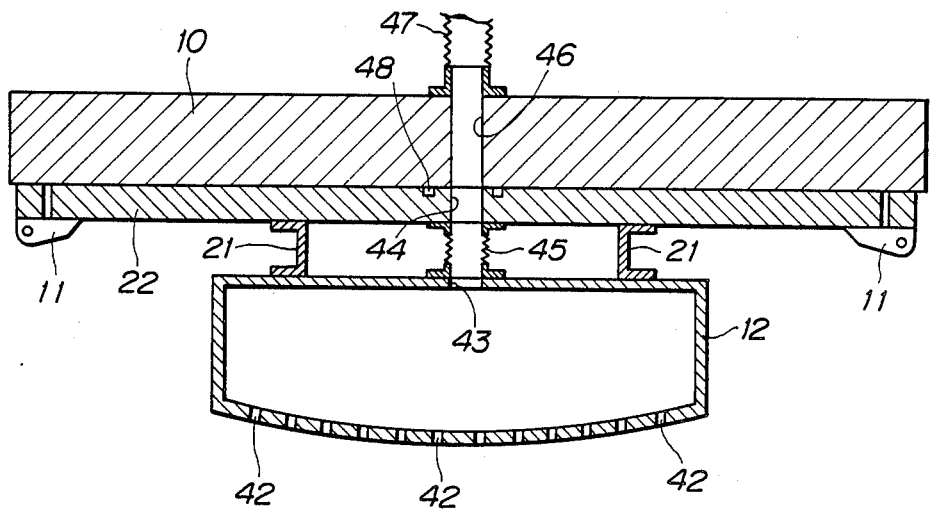
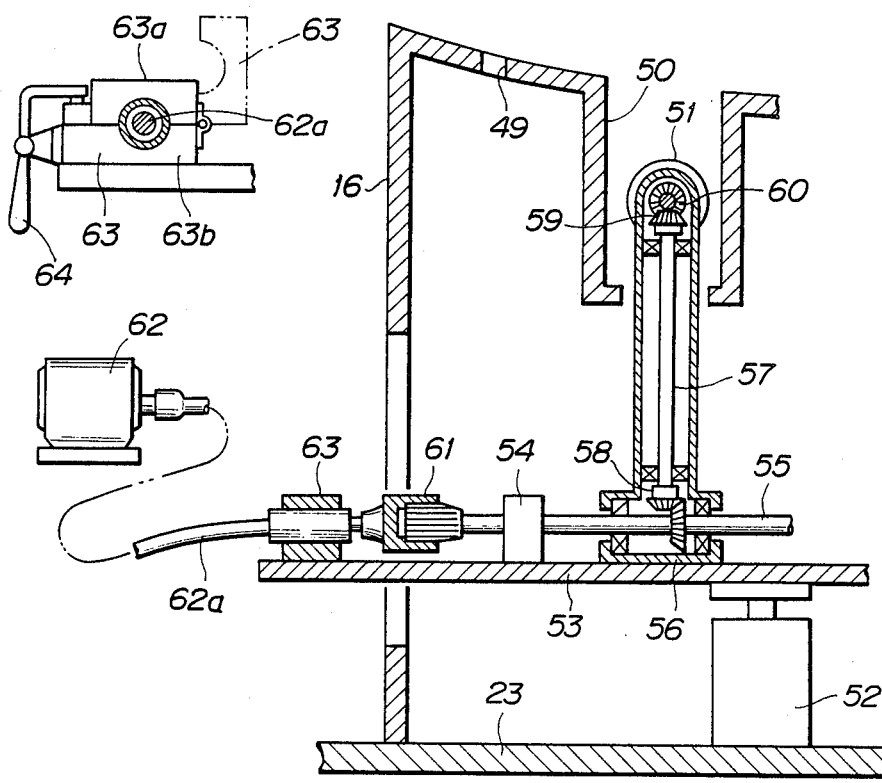

APPARATUS FOR SHAPING GLASS SHEET

BACKGROUND OF THE INVENTION

1. Field of the Invention

The present invention relates generally to an apparatus for shaping a glass sheet to a desired curvature, and more particularly to a glass sheet shaping apparatus having a device capable of replacing upper and lower mold members concurrently.

2. Description of the Relevant Art

One known apparatus for shaping a curved reinforced glass sheet for use as an automotive window glass sheet is disclosed in Japanese Patent Publication No. 53/12931. The disclosed apparatus operates by heating a glass sheet in a heating furnace up to the softening point of glass, feeding the heated glass sheet horizontally with conveyor rollers to a position between upper and lower mold members, raising the lower mold member above the conveyor rollers to receive the glass sheet on the lower mold member, and finally pressing the glass sheet to a desired shape between the upper and lower mold members.

When the shape of a glass sheet to be achieved by the shaping apparatus is to be varied, it is necessary to replace the upper and lower mold members with desired upper and lower mold members. The upper and lower mold members are fixed to respective surface plates secured to vertical cylinders of the shaping apparatus. For replacing the upper and lower mold members, therefore, they are detached from the surface plates, respectively, and delivered to respective stocking places. Then, new upper and lower mold members are brought from the stocking places to the shaping apparatus where they are fastened to the respective surface plates. Before the upper mold member is attached to the surface plate, it must be lifted up to the surface plate. After the upper and lower mold members are attached to the respective surface plates, their positions have to be adjusted so that they are axially aligned with each other.

As described above, the procedure of mold member replacement has heretofore been quite complex and timeconsuming. Furthermore, the replacement process requires a total shutdown of the facility for shaping glass sheets.

SUMMARY OF THE INVENTION

Accordingly, it is an object of the present invention to provide a glass sheet shaping apparatus capable of replacing mold members easily in a short period of time.

Another object of the present invention is to provide a glass sheet shaping apparatus which allows easy adjustment of positions in which upper and lower mold members are attached in the process of mold member replacement.

Still another object of the present invention is to provide a glass sheet shaping apparatus capable of smoothly bringing upper and lower mold members into and out of a frame assembly upon mold member replacement.

To accomplish the above objects, there is provided an apparatus for shaping a curved reinforced glass sheet by bending a glass sheet which has been heated by a heating furnace up to a softening point and thereafter cooling the bent glass sheet with a cooling medium and imparting a prescribed stress to the glass sheet, the apparatus comprising upper and lower mold members for bending the glass sheet, a frame assembly having a top plate, a bottom plate, and a plurality of posts vertically connected between the top and bottom plates, a first vertically displacing device mounted on the top plate, an upper surface plate coupled to the first vertically displacing device and vertically movable thereby in the frame assembly, a second vertically displacing device mounted on the bottom plate, a lower surface plate coupled to the second vertically displacing device and vertically movable thereby in the frame assembly, a first common plate fixed to the upper mold member and detachably secured to the upper surface plate by fixing means, a second common plate fixed to the lower mold member and detachably secured to the lower surface plate by fixing means, positioning means disposed between the first and second common plates for positioning the upper and lower mold members with respect to each other, and a carrier for carrying a unit assembly comprising the upper and lower mold members and the first and second common plates upon replacement of the mold members.

The positioning means comprises a plurality of seats mounted on a lower surface of the first common plate, a plurality of seats mounted on an upper surface of the second common plate, and a plurality of positioning rods detachably disposed between the seats on the first and second common plates.

The lower surface plate has a plurality of steel balls and a plurality of springs disposed in the lower surface plate for normally urging the steel balls, respectively, to move upwardly for allowing the steel balls to project slightly from an upper surface of the lower surface plate. Likewise, the carrier has a plurality of steel balls and a plurality of springs disposed in the carrier for normally urging the steel balls, respectively, to move upwardly for allowing the steel balls to project slightly from an upper surface of the carrier. With the above arrangement, the unit assembly of the upper and lower mold members and common plates can smoothly be moved on the lower surface plate and the carrier.

The above and further objects, details and advantages of the present invention will become apparent from the following detailed description of a preferred embodiment thereof, when read in conjunction with the accompanying drawings.

BRIEF DESCRIPTION OF THE DRAWINGS

FIG. 10 is a cross-sectional view of the upper mold member;

FIG. 11 is a fragmentary cross-sectional view of the lower mold member;

FIG. 12 is an end view, partly in cross section, of a clamp; and

DETAILED DESCRIPTION OF THE PREFERRED EMBODIMENT

Figure 1:
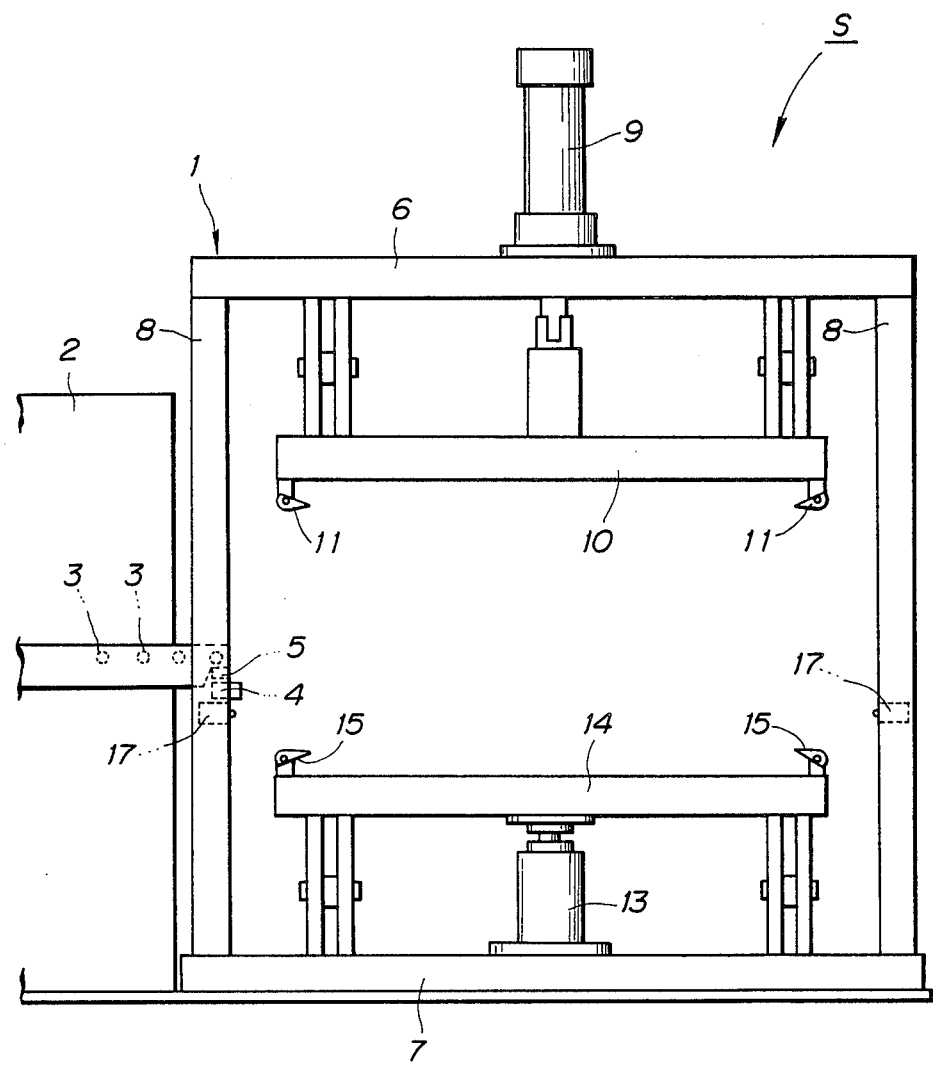
FIG. 1 is a schematic front elevational view of an apparatus for shaping a glass sheet according to the present invention.

As shown in FIG. 1, a glass sheet shaping apparatus S according to the present invention has a frame assembly 1. A heating furnace 2 for heating a glass sheet to a temperature close to the softening point of glass is disposed adjacent to the frame assembly 1. The heating furnace 2 has therein a plurality of horizontally spaced conveyor rollers 3 for conveying a glass sheet in a horizontal direction. The heating furnace 2 has a motor (not shown) for rotating a driver gear 4 meshing with a driven gear 5. Rotation of the driven gear 5 is transmitted via a shaft and helical gears to the conveyor rollers 3. Thus, the conveyor rollers 3 can be rotated by the motor in the heating furnace 2.

The frame assembly 1 comprises a top plate 6, a bottom plate 7, and a plurality of posts 8 extending between the top and bottom plates 6, 7. A vertical cylinder unit 9 is fixed to the top plate 6 and has a lower end secured to an upper surface plate 10. An upper mold member 12 (see FIG. 3) is attached to the lower surface of the upper surface plate 10 by means of clamps 11. Likewise, a vertical cylinder unit 13 is fixed to the bottom plate 7 and has an upper end secured to a lower surface plate 14. A lower mold member 16 (see FIG. 4) is attached to the upper surface of the lower surface plate 14 by means of clamps 15. Support/lock members 17 are mounted on the posts 8 of the frame assembly 1 for supporting frames of conveyor rollers (described later) on the lower mold member 16.

Figure 2:
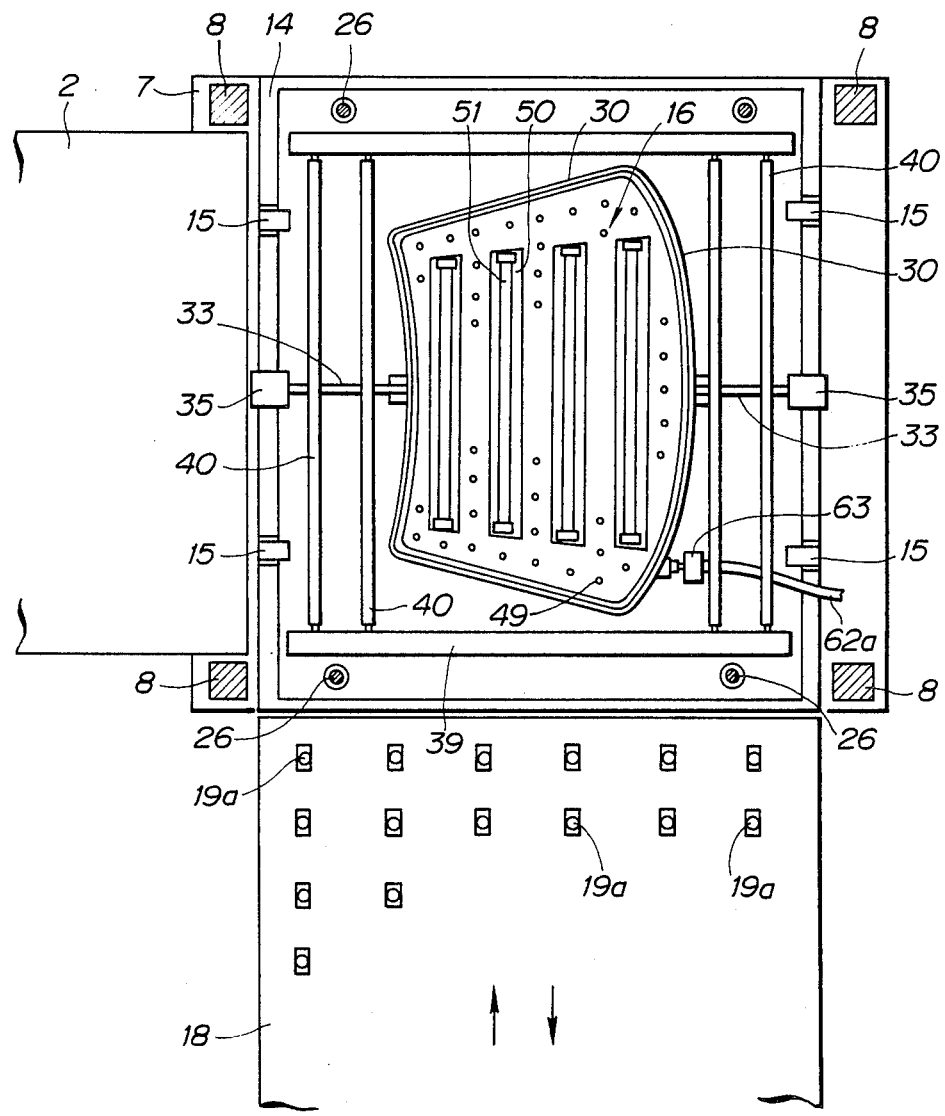
FIG. 2 is a plan view, partly cut away, of the glass sheet shaping apparatus.
Figure 3:
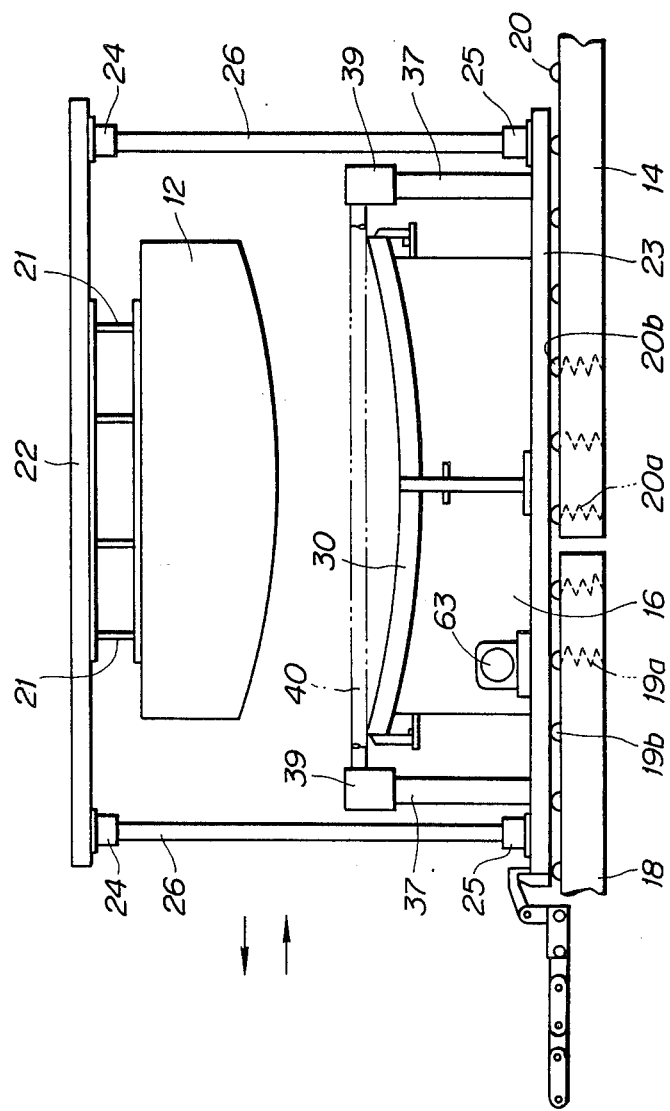
FIG. 3 is a side elevational view of a unit assembly of upper and lower mold members and common plates.

Between the frame assembly 1 and a mold member stocking area, there is disposed a carrier 18 (FIG. 2) in the form of a plate, as shown in FIG. 3, having a number of steel balls 19b normally urged by respective springs 19a accommodated in the carrier 18 to move upwardly so that the steel balls 19b project slightly from the upper surface of the carrier 18. Similarly, the lower surface plate 14 has a number of steel balls 20b normally urged by respective springs 20a accommodated in the lower surface plate 14 to move upwardly so that the steel balls 20b project slightly from the upper surface of the lower surface plate 20a.

Figure 5:
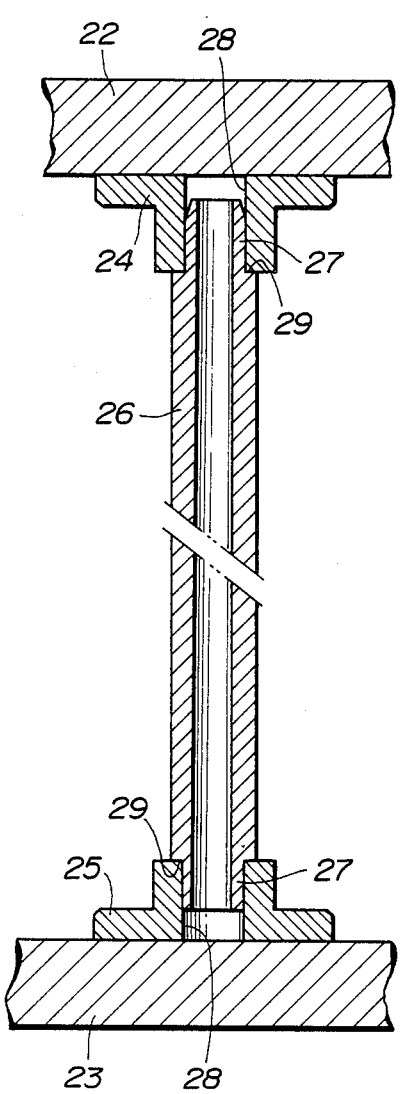
FIG. 5 is an enlarged cross-sectional view, partly cut away, of a positioning rod attached to a common plate.

The carrier 18 carries thereon the upper mold member 12 and the lower mold member 16 prior to their being set in the frame assembly 1. More specifically, as shown in FIG. 3, a common plate 22 is fixed to the upper surface of the upper mold member 12 by angle members 21, and a common plate 23 is fixed to the lower surface of the lower mold member 16. The common plates 22, 23 have seats 24, 25 on their lower and upper surfaces, respectively, with positioning rods 26 extending between the seats 24, 25 in respective pairs. As illustrated on enlarged scale in FIG. 5, each of the positioning rods 26 comprises a pipe having upper and lower end portions 27 of smaller diameter which are inserted respectively in recesses 28 defined in the seats 24, 25 with steps 29 of the positioning rod 26 being held against the end faces of the seats 24, 25. The seats 24, 25 are positioned such that when the positioning rods 26 are disposed in position between the seats 24, 25, the axes (central positions) of the upper and lower mold members 12, 16 are in full alignment with each other.

Figure 4:
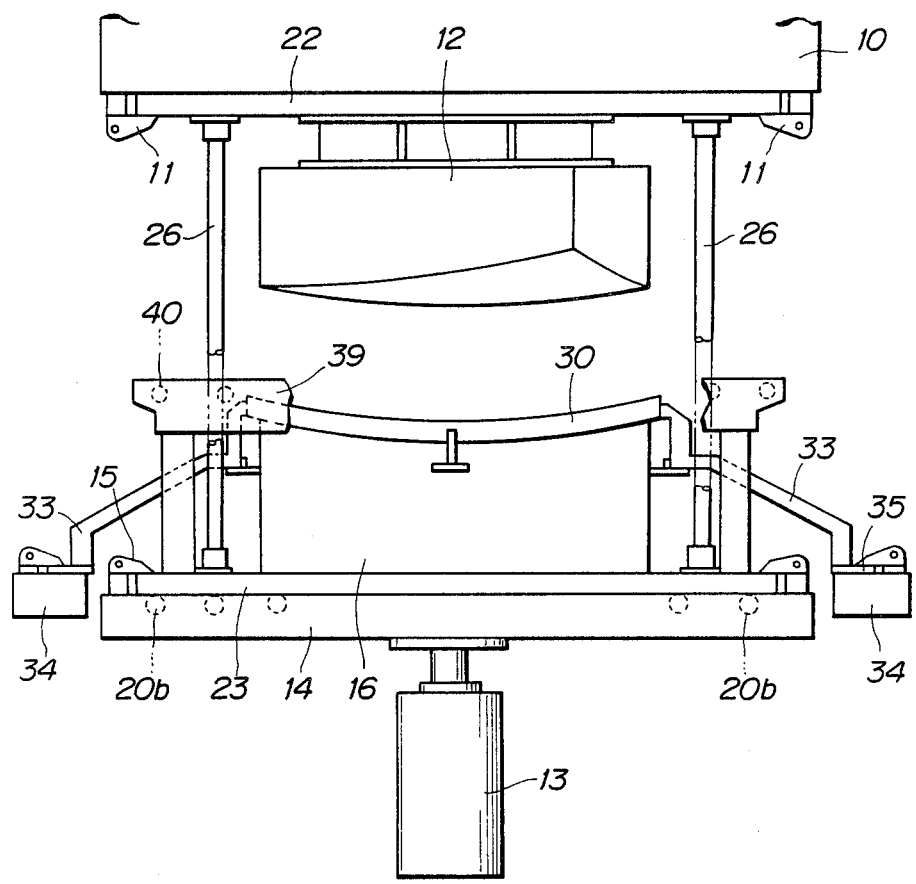
FIG. 4 is a front elevational view of the unit assembly of FIG. 3 as it is placed in a frame assembly.

The upper and lower mold members 12, 16 that are in coaxial alignment are moved by a suitable moving means (not shown) to push the lower common plate 23 over the carrier 18 onto the lower surface plate 14, as shown in FIG. 3, whereupon the common plate 23 is gripped by the clamps 15 on the lower surface plate 14, as illustrated in FIG. 4. At this time, the common plate 23 depresses the steel balls 20 into the lower surface plate 24, and the lower surface of the common plate 23 is held in close contact with the upper surface of the lower surface plate 24. Thereafter, the cylinder unit 9 is actuated to lower the upper surface plate 10 until the lower surface thereof is brought into abutment against the upper surface of the common plate 22 secured to the upper mold member 12. The common plate 22 is gripped by the clamps 11 on the upper surface plate 10. Then, the cylinder unit 9 is raised to lift the upper surface plate 10 and hence the upper mold member 12, and the positioning rods 26 are removed from between the common plates 22, 23. The apparatus is now readied for a glass sheet shaping process. The upper and lower mold members 12, 16 thus installed can be removed from the frame assembly 1 by placing the positioning rods 26 between the common plates 22, 23, unclamping the common plates 22, 23, and pulling the upper and lower mold members 12, 16 onto the carrier 18.

Figure 6:
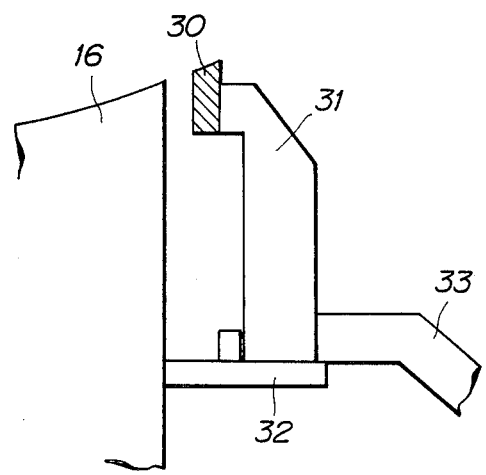
FIG. 6 is a fragmentary elevational view of a ring mold.

As shown in FIGS. 2 through 4, a ring mold 30 is disposed on the upper outer periphery of the lower mold member 16 for shaping the peripheral edge of a glass sheet. As shown in FIG. 6, the ring mold 30 is supported on the lower mold member 16 by means of downwardly projecting legs 31 resting upon respective brackets 32 projecting laterally from the lower mold member 16. Arms 33 extend laterally from the respective legs 31 and have engagement fingers 35 on their distal ends. When the lower mold member 16 is placed in the frame assembly 1, the engagement fingers 35 engage respective oscillators 34 (see FIG. 4) supported on the frame assembly 1.

Figure 7:
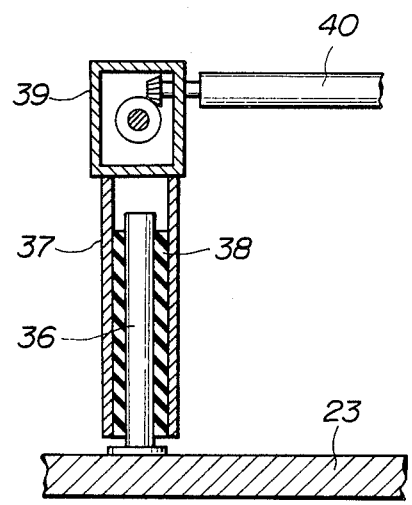
FIG. 7 is a fragmentary cross-sectional view of a corner of a common plate for the lower mold member.

As illustrated in FIG. 7, a guide rod 36 projects upwardly from the common plate 23, and a support sleeve 37 is vertically movably fitted over the guide rod 36 with a bushing 38 interposed between the guide rod 36 and the support sleeve 37. Such guide rods 36 and support sleeves 37 are disposed respectively on the four corners of the common plate 23. As shown in FIGS. 2 through 4, two parallel hollow frame members 39 extending in the direction in which a glass sheet is fed are supported on and extend between the respective pairs of the support sleeves 37. Conveyor rollers 40 are rotatably supported between the frame members 39 and extend perpendicularly to the direction of feed of a glass sheet. The conveyor rollers 40 serve to transfer a glass sheet that has been conveyed horizontally by the conveyor rollers 3 in the heating furnace 2 onto lifter rollers (described later on) in the lower mold member 16. The number of conveyor rollers 40 disposed between the lower mold member 16 and the conveyor rollers 3 in the direction of feed of a glass sheet varies from mold size to mold size.

Figure 8:
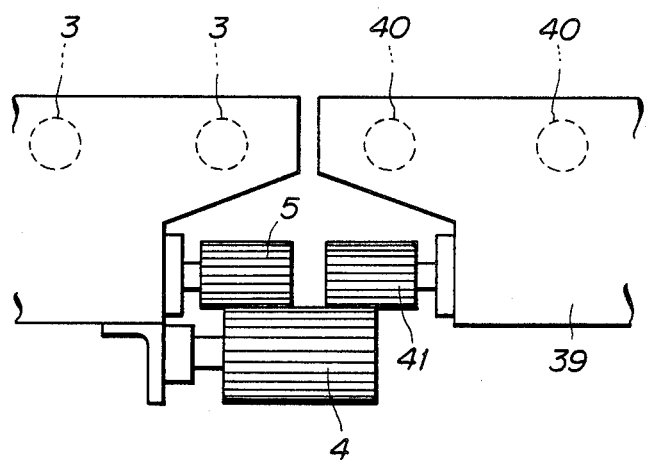
FIG. 8 is an enlarged fragmentary front elevational view showing the manner in which conveyor rollers are operatively coupled.
Figure 9:
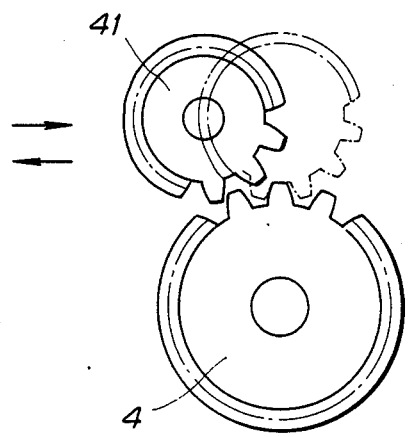
FIG. 9 is a view of a mechanism for operatively coupling the conveyor rollers illustrated in FIG. 8.

The conveyor rollers 40 are rotated by the motor mounted in the heating furnace 2. More specifically, as shown in FIG. 8, the conveyor rollers 40 are operatively coupled through helical gears (not shown) to a shaft in the frame member 39, and a driven gear 41 mounted on an end of the shaft in the frame member 39 is held in mesh with the driver gear 4. Therefore, the conveyor rollers 3, 40 are rotatable in synchronism with each other by the driver gear 4 rotated by the motor. The driven and driver gears 41, 4 are brought into mutual mesh as shown in FIG. 9. When the lower mold member 16 on the common plate 23 is displaced onto the lower surface plate 14, the driven gear 41 is also moved from the left to the right in FIG. 9 into mesh with the driver gear 4 as the drive gear 41 is freely rotatable. The driven gear 41 can automatically be brought out of mesh with the driver gear 4 by pulling the lower mold member 16 off the lower surface plate 14.

The internal structures of the upper and lower mold members 12, 16 will be described with reference to FIGS. 10 through 12. As shown in FIG. 10, the upper mold member 12 is of a hollow construction having a plurality of outlet holes 42 defined in a lower wall thereof for ejecting cooling air and an opening 43 defined centrally in an upper wall thereof. The opening 43 is coupled by a joint tube 45 to an aperture 44 defined in the common plate 22. With the common plate 22 clamped to the upper surface plate 10, the aperture 44 communicates with a through hole 46 defined in the upper surface plate 10 and connected to a source of pressurized air through a flexible pipe 47. A seal ring 48 is disposed in the common plate 22 around the aperture 44 for preventing air leakage from the aperture 44. Cooling air supplied from the pressurized-air source flows through the flexible pipe 47, the through hole 46, the aperture 44, the joint tube 45, and the opening 45 into the hollow upper mold member 12, from which the cooling air is ejected through the outlet holes 42 against the upper surface of a glass sheet that has been shaped by the upper mold member 12.

In FIG. 11, the lower mold member 16 has an upper wall defining therein a plurality of outlet holes 49 for ejecting cooling air. The upper wall of the lower mold member 16 also has downward recesses 50 each accommodating a lifter roller 51 (see FIG. 2) shorter than the conveyor rollers 3, 40.

A lifter plate 53 is disposed above the common plate 23 and vertically movable by a cylinder unit 52 mounted on the common plate 23. A shaft 55 is rotatably supported by bearings 54 on the lifter plate 53 and supports thereon helical gears 56 meshing with helical gears 58 fixed to the lower ends of vertical shafts 57 extending vertically movably through the bottoms of the recesses 50. Each of the vertical shafts 57 supports on its upper end a helical gear 59 held in mesh with a helical gear 60 secured to an end of the lifter roller 51. One end of the shaft 55 is connected by a coupler 61 to a flexible shaft 62a extending from a motor 62 mounted in the frame assembly 1, the flexible shaft 62a being supported by a clamp unit 63 mounted on the lifter plate 53. As shown in FIG. 12, the clamp member 63 comprises an upper member 63a and a lower member 63b, the upper member 63a being angularly movable by a lever 64 with respect to the lower member 63b. When a new mold assembly is set in the frame assembly 1, the flexible shaft 62a of the motor 62 is held by the clamp unit 63 by opening and closing the upper member 63a thereof, and the coupler 61 is connected to the shaft 55. Thus, the lifter rollers 51 of the new lower mold member 16 can be rotated by the motor 62.

Operation of the glass sheet shaping apparatus will be described below with further reference to FIGS. 13 through 16.

Figure 13:
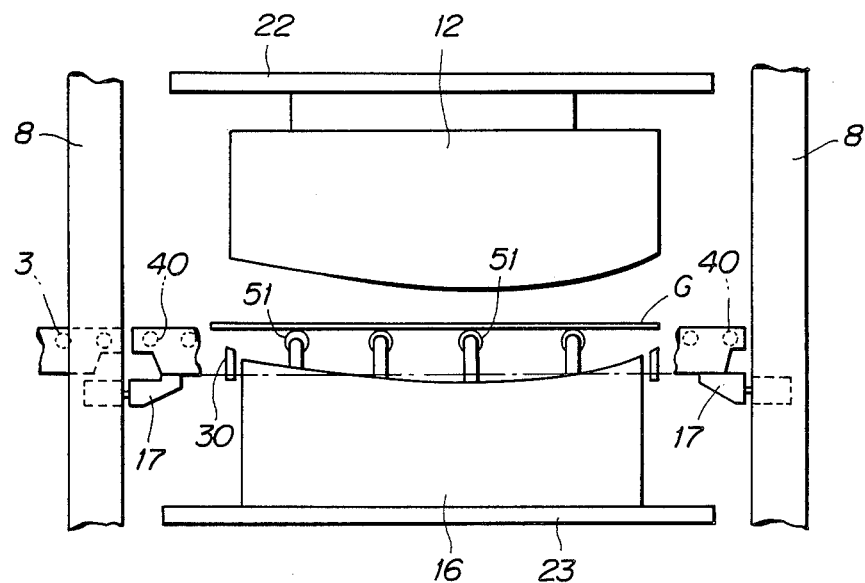
FIGS. 13 through 16 are schematic front elevational views of the glass sheet shaping apparatus, showing successive steps of shaping a glass sheet.

Desired upper and lower mold members 12, 16 which are coaxially aligned by the positioning rods 26 are transferred from the mold stocking place to a position over the lower surface plate 14 of the frame member 1. Then, the common plate 22, 23 are clamped to the upper and lower surface plates 10, 14, respectively, followed by removal of the positioning rods 26. At this time, as shown in FIG. 13, the driven gear 41 for rotating the conveyor rollers 40 automatically meshes with the driver gear 4, and the frames 39 supporting the conveyor rollers 40 have their lower surfaces supported by the support/lock members 17 attached to the frame assembly 1. The engagement fingers 35 of the arms 33 of the ring mold 30 also automatically engage the oscillators 34, respectively. The lifter rollers 51 are moved upwardly by the cylinder unit 52 in the lower mold member 16 until the lifter rollers 51 are positioned above the upper surface of the lower mold member 16. Now, the conveyor rollers 3, 40 and the lifter rollers 51 are positioned in a common horizontal plane.

A glass sheet G that has been heated to a temperature close to the softening point of glass while passing through the heating furnace 2 on the conveyor rollers 3 is conveyed by the conveyor rollers 40 onto the lifter rollers 51 above the lower mold member 16. The glass sheet G is placed on the lifter rollers 51 and then the motor 62 which rotates the lifter rollers 51 is deenergized.

Figure 14:
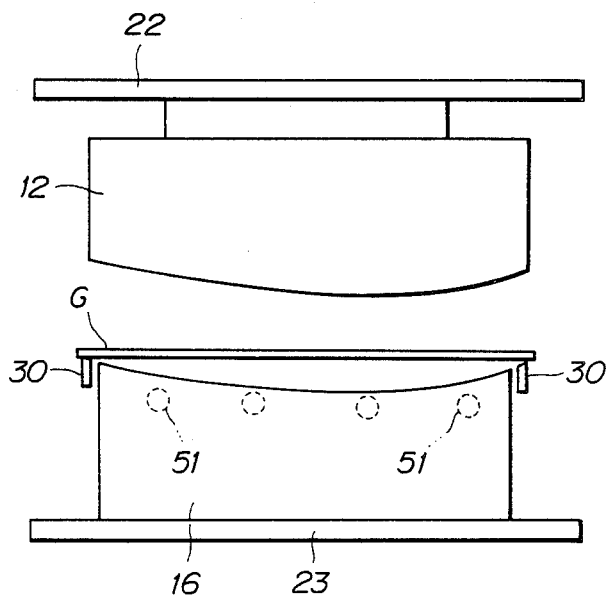

Then, the cylinder unit 52 is actuated to lower the lifter rollers 51 as shown in FIG. 14 to transfer the peripheral edge of the glass sheet G from the lifter rollers 51 onto the ring mold 30. As a result, the peripheral edge of the glass sheet G is shaped by gravity to the configuration of the ring mold 30.

Figure 15:
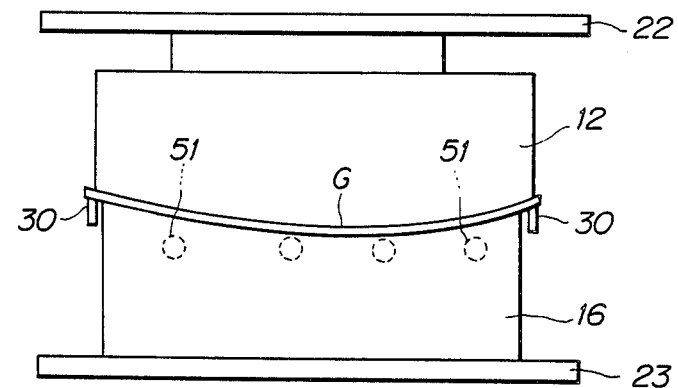
Figure 16:
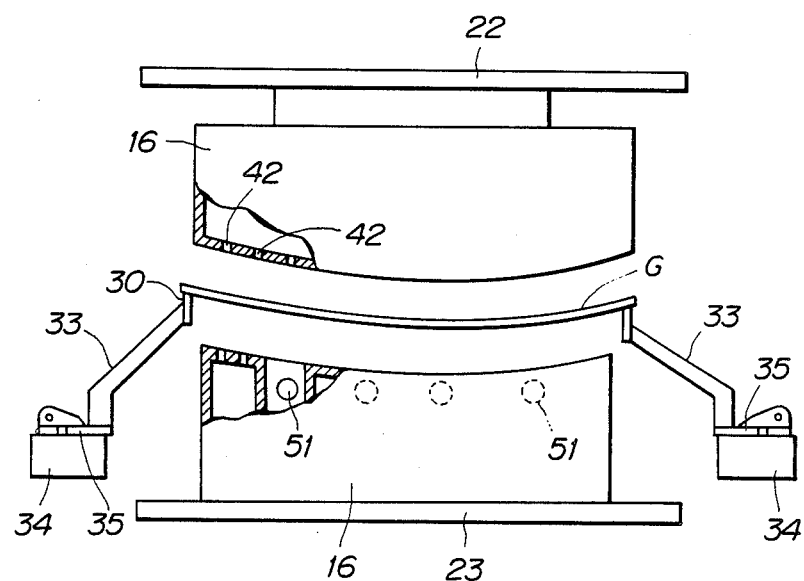

Thereafter, the cylinder unit 9 is operated to lower the upper mold member 12 for thereby pressing the glass sheet G entirely between the upper mold member 12, and the ring mold 30 and the lower mold member 16, as shown in FIG. 15, so that the glass sheet G is curved to a desired curvature.

When the shaping of the glass sheet G is finished, the cylinder units 9, 13 are actuated to lift the upper mold member 12 and lower the lower mold member 16. Since the frames 39 are supported, from below, by the support/lock members 17, the conveyor rollers 40 are not lowered in readiness for a next shaping cycle. The ring mold 30 is also not moved downwardly because the engagement fingers 35 of the arms 33 engage the respective oscillators 34. Therefore, the shaped glass sheet G is held on the ring mold 30. The oscillators 34 are now actuated to move the glass sheet G back and forth and laterally or turn the same in the horizontal plane, while at the same time cooling air is ejected from the outlet holes 42, 49 of the upper and lower mold members 12, 16 against the upper and lower surfaces of the glass sheet G for thereby quenching and tempering the shaped glass sheet G with a certain stress imparted thereto.

Subsequently, the glass sheet G is placed on the lifter rollers 51, and the lifter rollers 51 and the conveyor rollers 40 are rotated to feed the glass sheet G for a next process.

While in the illustrated embodiment the glass sheet G is transferred onto the lower mold member 16 and the ring mold 30 through descent of the lifter rollers 51, there may be employed a mechanism for transferring the glass sheet G from the lifter rollers 51 by raising the lower mold member 16 and the ring mold 30.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

I claim:

1. An apparatus for shaping a curved reinforced glass sheet by bending a glass sheet which has been heated by a heating furnace up to a softening point and thereafter cooling the bent glass sheet with a cooling medium and imparting a prescribed stress to the glass sheet, said apparatus comprising:

upper and lower mold members for bending the glass sheet;

a frame assembly having a top plate, a bottom plate, and a plurality of posts vertically connected between said top and bottom plates;

a first vertically displacing device mounted on said top plate;

an upper surface plate coupled to said first vertically displacing device and vertically movable thereby in said frame assembly;

a second vertically displacing device mounted on said bottom plate;

a lower surface plate coupled to said second vertically displacing device and vertically movable thereby in said frame assembly;

a first common plate fixed to said upper mold member and detachably secured to said upper surface plate by fixing means;

a second common plate fixed to said lower mold member and detachably secured to said lower surface plate by fixing means;

positioning means disposed between said first and second common plates for positioning said upper and lower mold members with respect to each other; and a carrier for carrying a unit assembly comprising said upper and lower mold members and said first and second common plates upon replacement of the upper and lower mold members.

2. An apparatus according to claim 1, wherein each of said fixing means comprises a plurality of clamps mounted on one of said upper and lower surface plates.

3. An apparatus according to claim 1, wherein said positioning means comprises a plurality of seats mounted on a lower surface of said first common plate, a plurality of seats mounted on an upper surface of said second common plate, and a plurality of positioning rods detachably disposed between the seats on the first and second common plates.

4. An apparatus according to claim 1, wherein said lower surface plate has a plurality of steel balls and a plurality of springs disposed in said lower surface plate for normally urging said steel balls, respectively, to move upwardly for allowing the steel balls to project slightly from an upper surface of said lower surface plate.

5. An apparatus according to claim 1, wherein said carrier has a plurality of steel balls and a plurality of springs disposed in said carrier for normally urging said steel balls, respectively, to move upwardly for allowing the steel balls to project slightly from an upper surface of said carrier.

6. An apparatus according to claim 1, further including moving means for moving said unit assembly on said carrier to and away from said lower surface plate in said frame assembly.

* * * * *